United States Patent
Wang et al.

(10) Patent No.: US 9,643,219 B2
(45) Date of Patent: May 9, 2017

(54) CLEANING DEVICE FOR REFLECTIVE SURFACE OF DISC LIGHT-CONDENSER

(75) Inventors: Shuhui Wang, Xiangtan (CN); Jianfeng Huang, Xiangtan (CN); Anwang Dang, Xiangtan (CN); Rongyao Liu, Xiangtan (CN); Yufen Tang, Xiangtan (CN); Qingsong Peng, Xiangtan (CN)

(73) Assignees: Xiangtan Liyuan Electric Tooling Co., Ltd. (CN); Xiangtan Electric Manufacturing Co., Ltd. (CN)

( * ) Notice: Subject to any disclaimer, the term of this patent is extended or adjusted under 35 U.S.C. 154(b) by 306 days.

(21) Appl. No.: 14/238,422

(22) PCT Filed: Apr. 27, 2012

(86) PCT No.: PCT/CN2012/074832
§ 371 (c)(1),
(2), (4) Date: Feb. 11, 2014

(87) PCT Pub. No.: WO2013/033995
PCT Pub. Date: Mar. 14, 2013

(65) Prior Publication Data
US 2014/0182635 A1 Jul. 3, 2014

(30) Foreign Application Priority Data

Sep. 9, 2011 (CN) .......................... 2011 1 0268030

(51) Int. Cl.
*B08B 3/02* (2006.01)
*F24J 2/46* (2006.01)
(Continued)

(52) U.S. Cl.
CPC ............. *B08B 3/024* (2013.01); *A21C 11/10* (2013.01); *B05B 13/0426* (2013.01); *B08B 5/02* (2013.01);
(Continued)

(58) Field of Classification Search
CPC ..................................................... B08B 3/024
See application file for complete search history.

(56) References Cited

U.S. PATENT DOCUMENTS 6,615,849 B1 * 9/2003 Gilman ................. E02F 3/8816
134/167 R
2011/0083664 A1 4/2011 Todd

FOREIGN PATENT DOCUMENTS

CN 1827243 A 9/2006
CN 101497443 A 8/2009
(Continued)

OTHER PUBLICATIONS

International Search Report for Application No. PCT/CN2012/074832 dated Jul. 26, 2012.

*Primary Examiner* — Jason Ko
(74) *Attorney, Agent, or Firm* — Lerner, David, Littenberg, Krumholz & Mentlik, LLP (57) ABSTRACT

A cleaning device for a reflective surface of a disc light-condenser includes a low pressure air transfer tube which is provided on the reflective surface of the disc light-condenser, driven by a pneumatic motor and capable of rotating around the central axis of the reflective surface of the disc light-condenser, and a high pressure water pipe provided in parallel with the low pressure air transfer tube; the lower end of the low pressure air transfer tube is connected with a plurality of air flow nozzles; the lower end of the high pressure water pipe is provided with a plurality of high pressure water nozzles via a nozzle mounting shaft; during cleaning, the low pressure air transfer pipe and the high pressure water pipe are connected to a mobile cleaning station of a solar power generating system via a fluid connecting pipe and a signal control line.

19 Claims, 6 Drawing Sheets

(51) Int. Cl.
  *B08B 5/02* (2006.01)
  *B05B 13/04* (2006.01)
  *A21C 11/10* (2006.01)
  *B05B 15/04* (2006.01)

(52) U.S. Cl.
  CPC ............ *F24J 2/461* (2013.01); *B05B 15/0425* (2013.01); *Y02E 10/40* (2013.01)

(56) References Cited

FOREIGN PATENT DOCUMENTS

| | | |
|---|---|---|
| CN | 201342415 Y | 11/2009 |
| CN | 101641164 A | 2/2010 |
| CN | 201401973 Y | 2/2010 |

\* cited by examiner

CLEANING DEVICE FOR REFLECTIVE SURFACE OF DISC LIGHT-CONDENSER

The present application is the national phase of International Application No. PCT/CN2012/074832, titled "CLEANING DEVICE FOR REFLECTIVE SURFACE OF DISC LIGHT-CONDENSER", filed on Apr. 27, 2012, which claims the benefit of priority to Chinese patent application No. 201110268030.7 titled "CLEANING DEVICE FOR REFLECTIVE SURFACE OF DISH CONCENTRATOR", filed with the Chinese State Intellectual Property Office on Sep. 9, 2011, both of which applications are incorporated herein in their entireties by this reference.

TECHNICAL FIELD

The present application relates to the technical field of solar power generation, and particularly to a cleaning device for a reflecting surface of a dish concentrator of a solar power generation system.

BACKGROUND

Solar energy is a sustainable and renewable new energy, and has been regarded as one of the most promising and most likely manner to solve the contradiction between the continually increasing energy demands in the future social development and the conventional energy supply due to its characteristics such as unlimited reserve, widespread distribution, cleanliness and economical efficiency. The solar power generation is the most important development direction of solar energy exploitation in the future and thus attracts more and more attention.

Solar power generation has mainly two manners including photovoltaic power generation and photothermal power generation. A concentrator is important for both the photovoltaic power generation and the photothermal power generation, since natural sunlight of a low energy density has to be collected by the concentrator to improve the energy density. In all of the light-concentrating manners, a dish concentrator may achieve two dimensional tracking more conveniently, and has a higher energy utilization coefficient, thus is not only adapted to distributed electricity supply, but also adapted to construct a high-power grid support electric station.

A light concentrating efficiency of a concentrator may also be affected by a cleanliness of a reflecting surface, in addition to a reflectivity of a reflecting material in a cleaning condition. After working for a period of time, the reflecting surface may be deposited with impurities, for example dust normally containing oily organics, and more impurities may be deposited on the reflecting mirror as the working time of the reflecting mirror increases, which may affect the reflecting efficiency of the reflecting surface, and decrease the light concentrating efficiency, and directly affect the system efficiency of the photoelectric conversion device, and decrease the output power of the electric station. The impurities deposited on the surface of the reflecting mirror cannot be cleaned by itself under a natural environment due to the oily organics in the dust, thus a special cleaning device is required to clean the reflecting mirror.

In view of this, a technical problem to be solved presently by those skilled in the art is to design a cleaning device for a reflecting surface of a dish concentrator in a solar power generation system in the prior art, so as to clean the reflecting surface of the concentrator automatically, and remove moisture remained on the reflecting surface rapidly, thereby significantly improving the light concentrating efficiency of the reflecting surface of the concentrator.

SUMMARY

The technical problem to be solved by the present application is to provide a cleaning device for a reflecting surface of a dish concentrator, which may clean the reflecting surface of the concentrator automatically, and remove moisture remained on the reflecting surface rapidly, thereby significantly improving the light concentrating efficiency of the reflecting surface of the concentrator.

For solving the technical problems, the present application provides a cleaning device for a reflecting surface of a dish concentrator including a low pressure air conveying tube and a high pressure water tube which are arranged side by side, the low pressure air conveying tube is arranged on the reflecting surface of the dish concentrator, driven by a pneumatic motor and rotatable about a central axis of the reflecting surface of the dish concentrator; a lower end of the low pressure air conveying tube is provided with a plurality of air flowing nozzles, and a lower end of the high pressure water tube is provided with a plurality of high pressure water nozzles via a nozzle mounting rod; in a cleaning operation, the low pressure air conveying tube and the high pressure water tube are connected to a mobile cleaning station of a solar power generation system via a fluid connecting tube and a signal controlling line; and after the cleaning operation is finished, the low pressure air conveying tube and the high pressure water tube are disconnected from the mobile cleaning station.

Preferably, one of the high pressure water tube is provided, and the plurality of high pressure water nozzles below the high pressure water tube are arranged in a single row at one side of the low pressure air conveying tube, and liquid in the high pressure water tube is water.

Preferably, a plurality of the high pressure water tubes are provided, and one row of the high pressure water nozzles are provided below each of the high pressure water tubes, multiple rows of the high pressure water nozzles are arranged at one side or two sides of the low pressure air conveying tube, and one or more of the high pressure water tubes contain water, and the rest of the high pressure water tubes contain mixed liquid of water and detergent.

Preferably, each of the high pressure water nozzles is a sector-shaped nozzle and each of the air flowing nozzles is a sector-shaped flowing nozzle.

Preferably, each of the air flowing nozzles is an air blowing nozzle connected to a bottom of the low pressure air conveying tube via a vertical air conveying branch tube.

Preferably, the air flowing nozzles are air blowing gaps arranged at a lower end of the low pressure air conveying tube, and a movable low pressure air tube is connected to an air inlet of an air blower; and widths of the air suction gaps gradually increase from a center to an edge in a radial direction of the reflecting surface of the concentrator.

Preferably, the air flowing nozzles are air suction gaps arranged at a lower end of the low pressure air conveying tube, widths of the air suction gaps gradually increase from a center to an edge in a radial direction of the reflecting surface of the concentrator; and a water-jetting direction of the high pressure water nozzle is biased toward the air suction gap, and a rear side of the low pressure air conveying tube is further provided with an air constraining plate.

Preferably, the low pressure air conveying tube is connected to a curved tube, a transition tube and a corrugated tube in sequence, and the low pressure air conveying tube is mounted inside a mounting seat via a first bearing and a second bearing, and the mounting seat is mounted on a supporter of the concentrator.

Preferably, the pneumatic motor is connected to the corrugated hose via a gear transmission mechanism or a worm gear transmission mechanism.

Preferably, the reflecting surface of the concentrator is of a sector shape, and a sensor seat is arranged at each of two ends of a periphery circular arc of the reflecting surface of the concentrator, and a reset sensor is arranged at an inner side of one of the two sensor seats, and a position-limiting sensor is arranged at an inner side of the other one of the two sensor seats; and two sides of a tail end of the low pressure air conveying tube are respectively provided with a reset detector corresponding to the reset sensor, and a position-limiting detector corresponding to the position-limiting sensor.

Preferably, the reflecting surface of the concentrator is a whole paraboloid of revolution, a sensor seat is arranged at a periphery of the paraboloid of revolution, and has two sides respectively provided with a reset sensor and a position-limiting sensor; and two sides of the tail end of the low pressure air conveying tube are respectively provided with a reset detector corresponding to the reset sensor, and a position-limiting detector corresponding to the position-limiting sensor.

The present application provides a cleaning device for a reflecting surface of a dish concentrator including a low pressure air conveying tube and a high pressure water tube which are arranged side by side. The low pressure air conveying tube is arranged on the reflecting surface of the dish concentrator, driven by a pneumatic motor and rotatable about a central axis of the reflecting surface of the dish concentrator. A lower end of the low pressure air conveying tube is provided with a plurality of air flowing nozzles, and a lower end of the high pressure water tube is provided with a plurality of high pressure water nozzles via a nozzle mounting rod. In a cleaning operation, the low pressure air conveying tube and the high pressure water tube are connected to a mobile cleaning station of a solar power generation system via a fluid connecting tube and a signal controlling line; and after the cleaning operation is finished, the low pressure air conveying tube and the high pressure water tube are disconnected from the mobile cleaning station.

With such structure, when it is not required to clean the concentrator, for example during the sun tracking process, all components, other than the mobile cleaning station and related movable connecting tubes, move along with the reflecting surface of the concentrator, i.e., the cleaning device and the reflecting surface are static relative to each other. When it is required to clean the concentrator, the mobile cleaning station is moved to the vicinity of the dish concentrator, a movable high pressure air tube, a movable low pressure air tube, and a movable high pressure water tube are, respectively, connected to an air quick connector, a corrugated hose, and a high pressure water quick connector, and related devices of the mobile cleaning station, such as a high pressure air pump, an air blower and a high pressure water pump, are actuated. At this time, high pressure water from the mobile cleaning station flows through the movable high pressure water tube, the high pressure water quick connector, a high pressure crossing water tube, a high pressure hose, the high pressure water tube and the nozzle mounting rod in sequence and enters the high pressure water nozzles to be jetted to form a high pressure jetted water flow, and the high pressure jetted water flow may flush the impurities deposited on the reflecting surface of the concentrator due to its high speed and strong flushing capacity. Meanwhile, low pressure air from the mobile cleaning station flows through the movable low pressure air tube, the corrugated hose, a transition tube, a curved tube and the low pressure air conveying tube in sequence and enters the air flowing nozzles to be jetted to form a jetted air flow, and the jetted air flow may remove moisture remained on the reflecting surface of the concentrator from the high pressure jetted water flow, thereby ensuring the reflecting efficiency of the reflecting surface of the concentrator.

Thus, the cleaning device having such structure may not only clean the reflecting surface of the concentrator automatically, but also remove the moisture remained on the reflecting surface quickly, thereby significantly improving the light concentrating efficiency of the reflecting surface of the concentrator.

Corresponding relationships between reference numerals and components in FIGS. 1 to 11 are as follows.

| | |
|---|---|
| 1 low pressure air conveying tube | 2 nozzle mounting rod, |
| 3 high pressure water tube, | 4 pulling cord, |
| 5 tube clip, | 6 tensioner, |
| 7 air conveying branch tube, | 8 curved tube, |
| 9 pulling cord supporter, | 10 high pressure hose, |
| 11 transition tube, | 12 mounting seat, |
| 13 pneumatic motor, | 14 air quick connector, |
| 15 corrugated hose, | 16 high pressure water quick connector, |
| 17 winding tube, | 18 high pressure crossing water tube, |
| 19 supporter, | 20 movable high pressure air tube, |
| 21 movable low pressure air tube, | 22 movable high pressure water tube, |
| 23 mobile cleaning station, | 24 air blowing nozzle, |
| 25 high pressure jetted water flow, | 26 high pressure water nozzle, |
| 27 reflecting surface of a concentrator, | 28 jetted air flow, |
| 29 first bearing, | 30 transmission shaft, |
| 31 bearing seat, | 32 driving gear, |
| 33 driven gear, | 34 second bearing, |
| 35 air blowing gap, | 36 air suction gap, |

-continued

| | |
|---|---|
| 37 air constraining plate, | 38 position-limiting detector, |
| 39 reset detector, | 40 reset sensor, |
| 41 sensor seat, and | 42 position-limiting sensor. |

DETAILED DESCRIPTION

An object of the present application is to provide a cleaning device for a reflecting surface of a dish concentrator, which may clean the reflecting surface of the concentrator automatically, and remove moisture remained on the reflecting surface rapidly, thereby significantly improving the light concentrating efficiency of the reflecting surface of the concentrator.

For those skilled in the art to understand better the technical solutions of the present application, the present application will be further explained in detail hereinafter in conjunction with the drawings and the specific embodiments.

Figure 1:
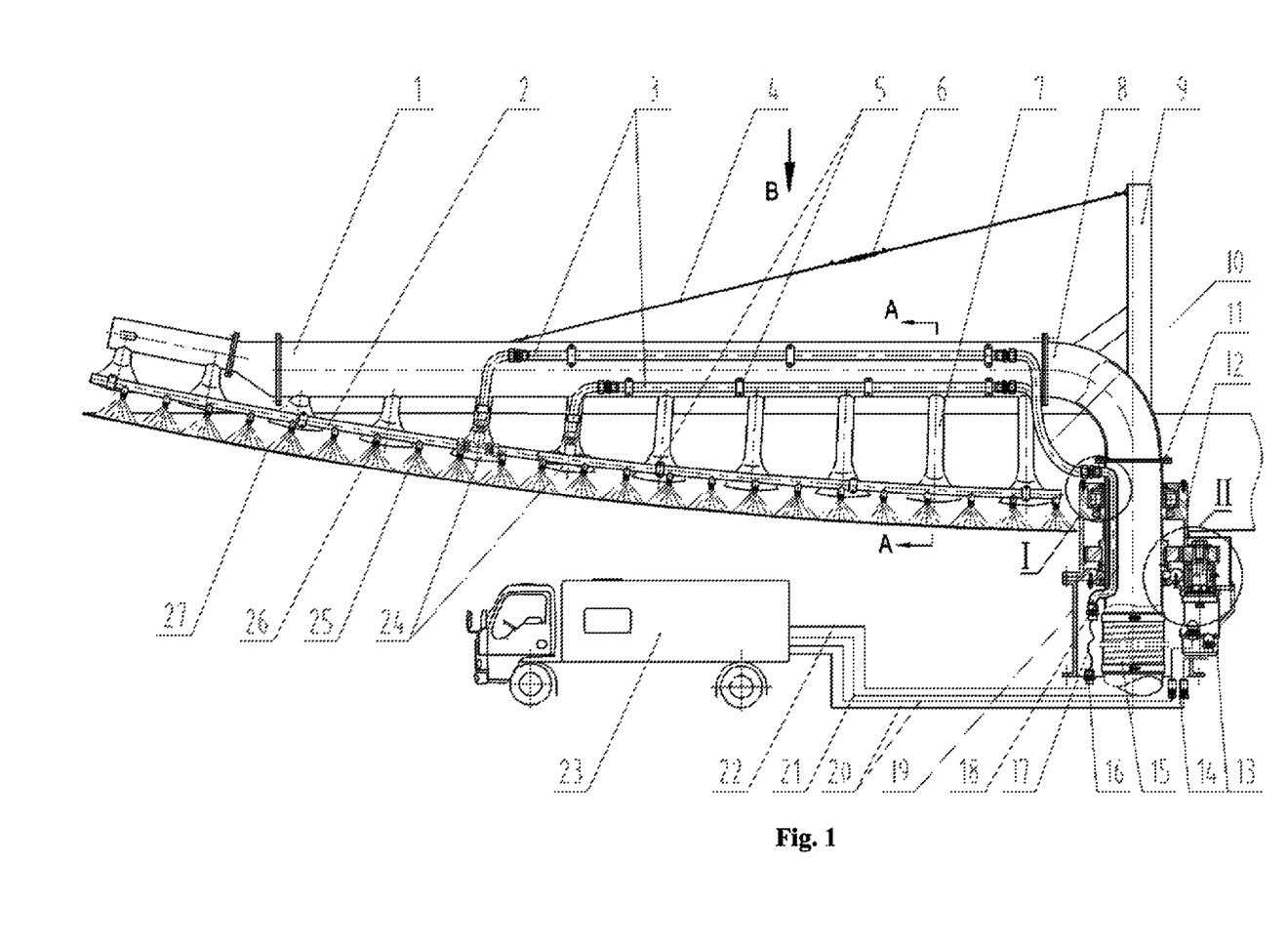
FIG. 1 is a schematic view showing the structure of a cleaning device for a reflecting surface of a dish concentrator according to an embodiment of the present application.

Reference is made to FIG. 1, which is a schematic view showing the structure of a cleaning device for a reflecting surface of a dish concentrator according to an embodiment of the present application.

In the embodiment as shown in FIG. 1, the cleaning device for a reflecting surface 27 of a dish concentrator according to the present application includes a low pressure air conveying tube 1 and a high pressure water tube 3 which are arranged side by side, the low pressure air conveying tube 1 is arranged on the reflecting surface 27 of the dish concentrator, driven by a pneumatic motor 13 and rotatable about a central axis of the reflecting surface 27 of the dish concentrator. A lower end of the low pressure air conveying tube 1 is provided with a plurality of air flowing nozzles, a lower end of the high pressure water tube 3 is fixedly provided with a nozzle mounting rod 2 via tube clips 5, and the nozzle mounting rod 2 is provided with a plurality of high pressure water nozzles 26. In a cleaning operation, the low pressure air conveying tube 1 and the high pressure water tube 3 are connected to a mobile cleaning station 23 of a solar power generation system via a fluid connecting tube and a signal controlling line; and after the cleaning operation is finished, the low pressure air conveying tube 1 and the high pressure water tube 3 are disconnected from the mobile cleaning station 23.

With such structure, when it is not required to clean the concentrator, for example during the sun tracking process, all components, other than the mobile cleaning station 23 and related movable connecting tubes, move along with the reflecting surface 27 of the concentrator, i.e., the cleaning device and the reflecting surface are static relative to each other. When it is required to clean the concentrator, the mobile cleaning station 23 is moved to the vicinity of the dish concentrator, a movable high pressure air tube 20, a movable low pressure air tube 21, and a movable high pressure water tube 22 are, respectively, connected to an air quick connector 14, a corrugated hose 15, and a high pressure water quick connector 16, and related devices of the mobile cleaning station 23, such as a high pressure air pump, an air blower and a high pressure water pump, are actuated. At this time, high pressure water from the mobile cleaning station 23 flows through the movable high pressure water tube 22, the high pressure water quick connector 16, a high pressure crossing water tube 18, a high pressure hose 10, the high pressure water tube 3 and the nozzle mounting rod 2 in sequence and enters the high pressure water nozzles 26 to be jetted to form a high pressure jetted water flow 25, and the high pressure jetted water flow 25 may flush the impurities deposited on the reflecting surface 27 of the concentrator due to its high speed and strong flushing capacity. Meanwhile, low pressure air from the mobile cleaning station 23 flows through the movable low pressure air tube 21, the corrugated hose 15, a transition tube 11, a curved tube 8 and the low pressure air conveying tube 1 in sequence and enters the air flowing nozzles to be jetted to form a jetted air flow 28, and the jetted air flow 28 may remove moisture remained on the reflecting surface 27 of the concentrator from the high pressure jetted water flow 25, thereby ensuring the reflecting efficiency of the reflecting surface 27 of the concentrator.

Thus, the cleaning device having such structure may not only clean the reflecting surface 27 of the concentrator automatically, but also remove the moisture remained on the reflecting surface quickly, thereby significantly improving the light concentrating efficiency of the reflecting surface 27 of the concentrator.

Figure 2:
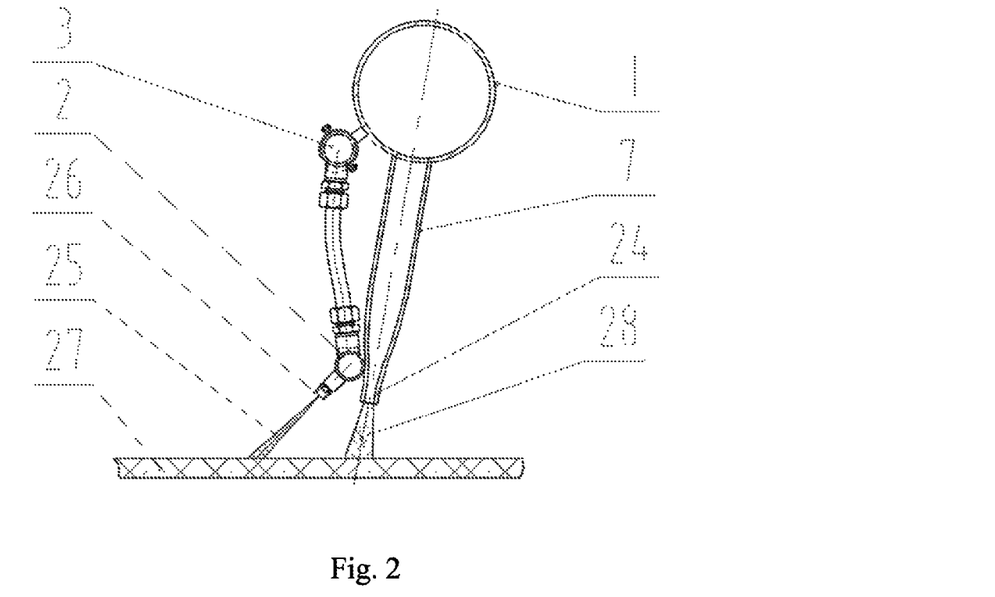
FIG. 2 is a sectional view taken along line A-A in FIG. 1.
Figure 3:
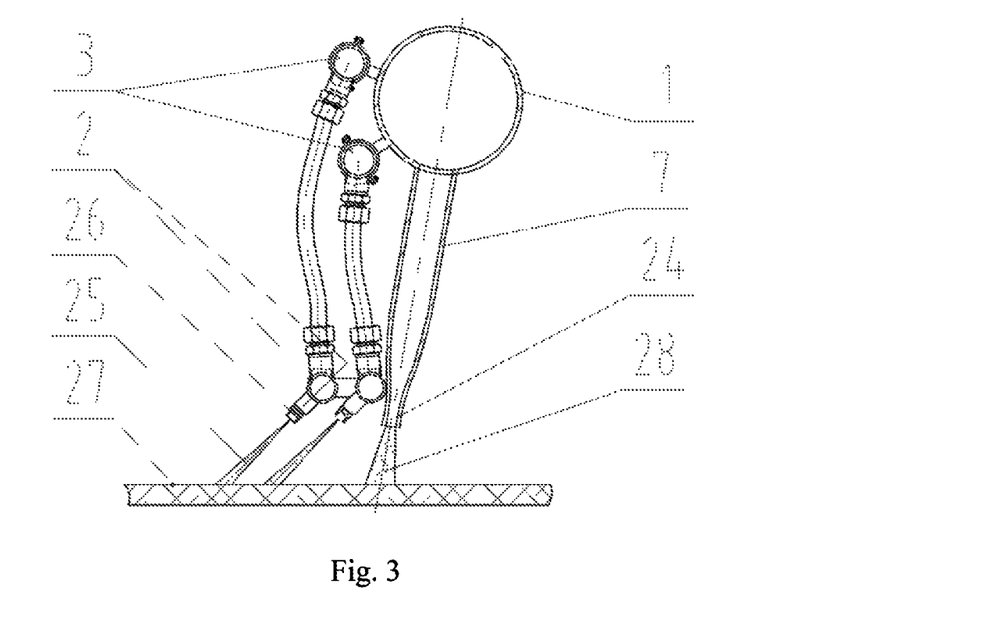
FIG. 3 is a sectional view of a cleaning device for a reflecting surface of a dish concentrator according to a second embodiment of the present application taken along line A-A.

Specific number and mounting position of each of the high pressure water tube 3 and the high pressure water nozzles 26 may be further arranged. Reference is made to FIGS. 2 and 3, FIG. 2 is a sectional view taken along line A-A in FIG. 1; and FIG. 3 is a sectional view of a cleaning device for a reflecting surface of a dish concentrator according to a second embodiment of the present application taken along line A-A.

In another embodiment as shown in FIG. 2, one high pressure water tube 3 is provided in the cleaning device for the reflecting surface 27 of the dish concentrator. The plurality of high pressure water nozzles 26 below the high pressure water tube 3 are arranged in a single row at one side of the low pressure air conveying tube 1, and liquid in the high pressure water tube 3 is water.

With such structure, the reflecting surface 27 of the concentrator can be cleaned once entirely after the low pressure air conveying tube 1 is driven by the pneumatic motor 13 to rotate for one cycle. The cleaning device having such structure has a simple structure, and is convenient to process and manufacture.

Apparently, other structural forms may be employed. A plurality of high pressure water tubes 3 may be provided, and one row of high pressure water nozzles 26 are provided below each of the high pressure water tubes 3. Multiple rows of the high pressure water nozzles 26 are arranged at one side or two sides of the low pressure air conveying tube 1, and one or more of the high pressure water tubes 3 contain water, and the rest of the high pressure water tubes 3 contain mixed liquid of water and detergent.

With such structure, if the reflecting surface 27 of the concentrator is in a whole rotating parabolic shape, and the multiple rows of the high pressure water nozzles 26 are arranged at two sides of the low pressure air conveying tube 1, the high pressure water nozzles 26 at one side of the low pressure air conveying tube 1 may be firstly opened and the low pressure air conveying tube 1 is driven to rotate over half of the area of the reflecting surface 27 of the concentrator, and then the low pressure air conveying tube 1 is driven to rotate reversely with the high pressure water nozzles 26 at the other side of the low pressure air conveying tube 1 being opened. After returning to the initial position, the low pressure air conveying tube 1 continues to rotate over the other half of the area of the reflecting surface 27 of the concentrator, and then the low pressure air conveying tube 1 is driven to rotate reversely again with only the high pressure water nozzles 26 at the former side being opened, till the cleaning device returns to the original position. By this way, the reflecting surface 27 of the concentrator may be cleaned twice, and it may facilitate reducing the probability of failure of the winding tube 17 during the rotation of the cleaning mechanism, however, this structure is relatively complicated. Apparently, when the multiple rows of the high pressure water nozzles 26 are arranged at one side of the low pressure air conveying tube 1, the reflecting surface 27 of the concentrator may also be cleaned twice by alternately opening the multiple rows of the high pressure water nozzles 26.

Figure 4:
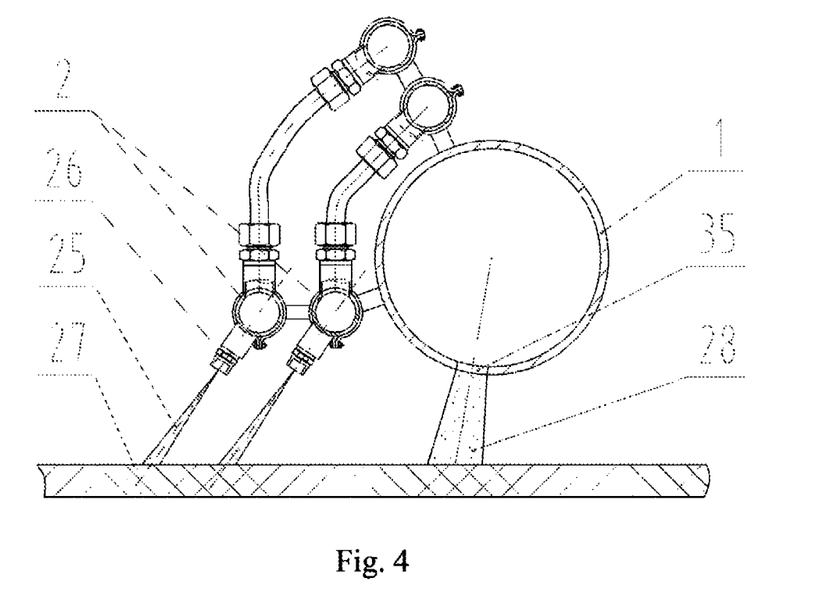
FIG. 4 is a sectional view of a cleaning device for a reflecting surface of a dish concentrator according to a third embodiment of the present application taken along line A-A.
Figure 5:
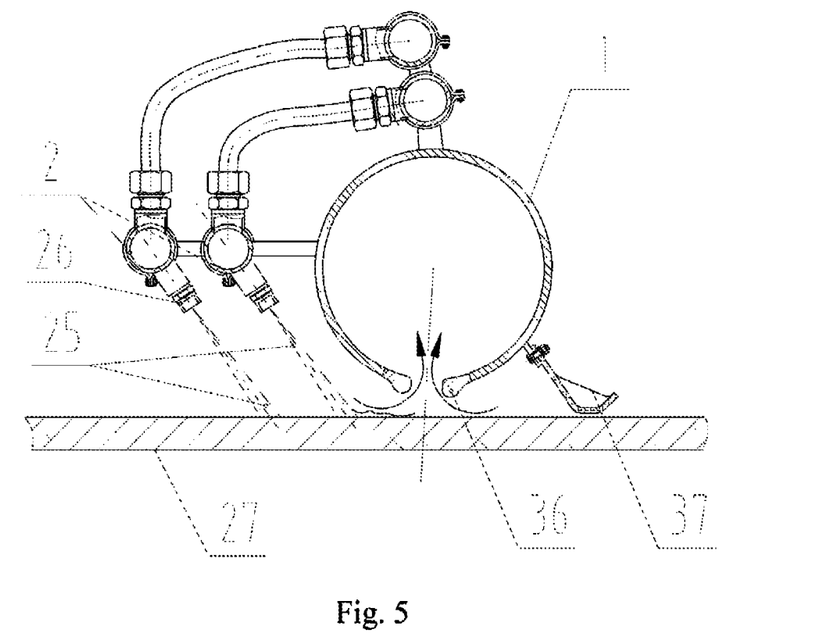
FIG. 5 is a sectional view of a cleaning device for a reflecting surface of a dish concentrator according to a fourth embodiment of the present application taken along line A-A.

The specific structural form of the air flowing nozzle may be further arranged. Reference is made to FIGS. 3, 4 and 5, FIG. 4 is a sectional view of a cleaning device for a reflecting surface of a dish concentrator according to a third embodiment of the present application taken along line A-A; and FIG. 5 is a sectional view of a cleaning device for a reflecting surface of a dish concentrator according to a fourth embodiment of the present application taken along line A-A.

In another embodiment as shown in FIG. 2, the air flowing nozzle may be an air blowing nozzle 24 connected to a bottom of the low pressure air conveying tube 1 via a vertical air conveying branch tube 7. With such structure, air flows into the air conveying branch tube 7 through the low pressure air conveying tube 1, and then is jetted via the air blowing nozzle 24 to form the jetted air flow 28 which may dry the moisture remained on the reflecting surface 27 of the concentrator by blowing.

Apparently, the air flowing nozzle is not limited to the above structures, and may be in other structural forms. As shown in FIG. 4, the air flowing nozzle may be an air blowing gap 35 arranged at a lower end of the low pressure air conveying tube 1, and widths of the air blowing gaps 35 gradually increase from a center to an edge in a radial direction of the reflecting surface 27 of the concentrator.

With such structure, the air blowing gaps 35 may also dry the remained moisture by blowing. A linear speed of the cleaning operation is required to be increased from the center to the edge in the radial direction of the reflecting surface 27 of the concentrator, i.e., the speed of the jetted air flow 28 is required to be increased. As gets near the edge portion, a flowing stroke of the air flow is increased, and a linear loss of the low pressure air in the low pressure air conveying tube 1 is increased. Hence, the widths of the air blowing gaps 35 are arranged to be gradually increased from the center to the edge in the radial direction of the reflecting surface 27 of the concentrator, which compliances with the special situation of the reflecting surface 27 of the concentrator, thereby ensuring the cleaning effect of the cleaning device at the edge portion of the reflecting surface 27 of the concentrator.

In another embodiment as shown in FIG. 5, the air flowing nozzle may be an air suction gap 36 arranged at the lower end of the low pressure air conveying tube 1. A movable low pressure air tube 21 is connected to an air inlet of the air blower. Widths of air suction gaps 36 gradually increase from the center to the edge in a radial direction of the reflecting surface 27 of the concentrator. A water-jetting direction of the high pressure water nozzle is biased toward the air suction gap 36, and a rear side of the low pressure air conveying tube 1 is further provided with an air constraining plate 37.

With such structure, when starting the air blower, the air suction gaps 36 may dry the moisture remained on the reflecting surface 27 of the concentrator by suctioning. Similar to the air blowing gaps 35, the widths of the air suction gaps 36 are arranged to be gradually increased from the center to the edge so as to ensure the cleaning effect of the cleaning device at the edge portion of the reflecting surface 27 of the concentrator. Besides this, the cleaning device with such structure may further recycle the cleaning water, thereby saving the cleaning cost of the concentrator. Since the water-jetting direction of the high pressure water nozzle 26 is biased toward the air suction gaps 36, which may guide the jetted water flow, thus the remained moisture may get closer to the air suction gaps 36, which may facilitate the air suction gaps 36 drying the water by suctioning. Similarly, the air constraining plate 37 at the rear side of the low pressure air conveying tube 1 may also strengthen the effect of the cleaning device drying the moisture remained on the reflecting surface 27 of the concentrator by suctioning.

In another embodiment, the high pressure water nozzle 26 may be a sector-shaped nozzle. With such structure, the water flow jetted from the sector-shaped nozzle is also in a sector shape, which may cover a bigger area, and strengthen the cleaning capacity of each high pressure water nozzle 26, thereby strengthening the efficiency of the cleaning device of cleaning the reflecting surface 27 of the concentrator. Similarly, the air flowing nozzle may also be a sector-shaped flowing nozzle, which may also strengthen the efficiency of the cleaning device of cleaning the reflecting surface 27 of the concentrator.

The rotatable connecting manner and the driving manner between the low pressure air conveying tube 1 and the concentrator reflecting surface 27 may be further arranged.

Figure 6:
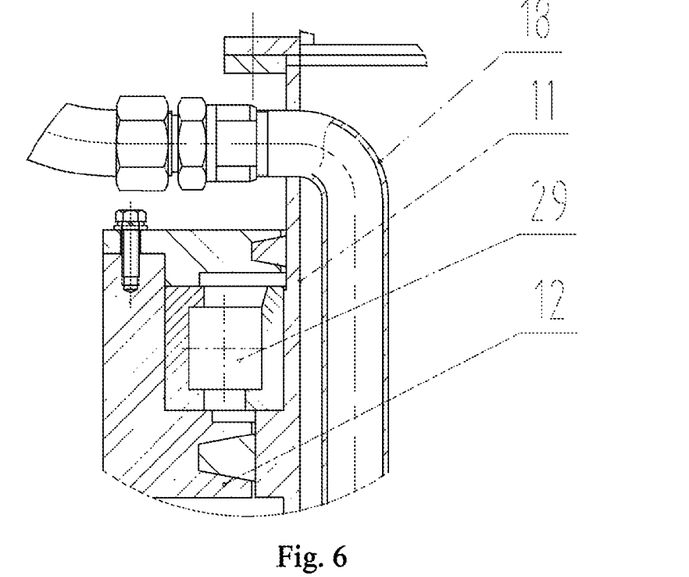
FIG. 6 is a partially enlarged view of portion I in FIG. 1.
Figure 7:
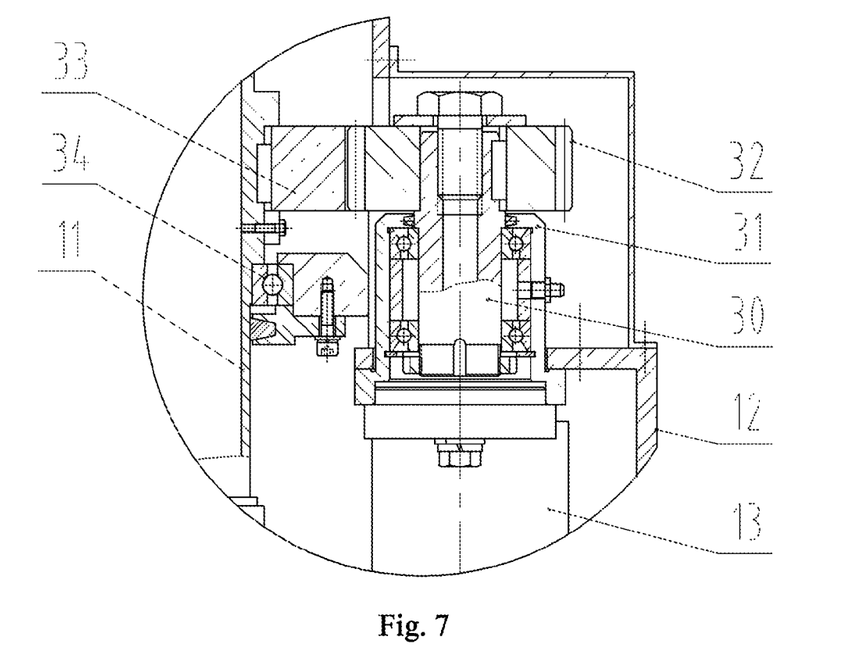
FIG. 7 is a partially enlarged view of portion II in FIG. 1.

Reference is made to FIGS. 6 and 7, FIG. 6 is a partially enlarged view of portion I in FIG. 1; and FIG. 7 is a partially enlarged view of portion II in FIG. 1.

In another embodiment as shown in FIGS. 1, 6 and 7, the low pressure air conveying tube 1 is connected to the curved tube 8, the transition tube 11 and the corrugated tube 15 in sequence, and the low pressure air conveying tube 1 is mounted inside a mounting seat 12 via a first bearing 29 and a second bearing 34, and the mounting seat 12 is connected to a supporter 19 of the concentrator.

With such structure, when it is required to clean the reflecting surface 27 of the concentrator, the pneumatic motor 13 is actuated to rotate the corrugated hose 15 with respect to the mounting seat 12, then the transition tube 11, the curved tube 8 and the low pressure air conveying tube 1 are driven to rotate with respect to the concentrator. Through the rotatable connecting manner using the bearing, it is convenient and simply to enable the low pressure air conveying tube to rotate along with the reflecting surface, thereby ensuring the smooth performance of the cleaning operation. Certainly, in addition to using the bearing to connect the corrugated tube 15 to the mounting seat 12, other rotatable connecting manners may also be adopted.

Further, the curved tube 8 may be further provided with a pulling cord supporter 9. The pulling cord 4 has one end tied to a front end of the low pressure air conveying tube 11, and the other end tied to a front end of the pulling cord supporter 9. The pulling cord 4 is provided with a tensioner 6 for tensioning the pulling cord 4, so as to strengthen the rigidity and strength of the low pressure air conveying tube 11, and avoid damage to the device due to overly large vibration amplitude caused by interferences of the high pressure water and air in the operation.

In a further solution, the pneumatic motor 13 may be connected to the corrugated hose 15 via a gear transmission mechanism. The pneumatic motor 13 is connected to a transmission shaft 30, the transmission shaft 30 is mounted inside a bearing seat 31, and the bearing seat 31 is mounted on the mounting seat 12. A driving gear 32 is mounted on the driving shaft 30, and a driven gear 33 is arranged at an outer side of the transition tube 11 to engage with the driving gear 32. In this way, when the pneumatic motor 13 is driven to rotate, the transmission shaft 30 is driven to rotate around a central axis of the reflecting surface 27 of the concentrator, and through the engagement transmission between the driving gear 32 and the driven gear 33, the rotation of the low pressure air conveying tube 1 around the reflecting surface 27 of the concentrator is achieved.

Apparently, the movement transmission manner is not limited to the gear transmission; the pneumatic motor 13 may also be connected to the corrugated tube 15 via a worm gear transmission mechanism. The worm gear transmission mechanism may also realize the rotation of the low pressure air conveying tube 1 around the reflecting surface 27 of the concentrator, and the worm gear transmission can realize a smooth movement.

A detecting device may be further arranged in the cleaning device for the reflecting surface 27 of the concentrator. Reference is made to FIGS. 8 to 11, FIG. 8 is a view seen in a direction B of FIG. 1; FIG. 9 is a partially enlarged view of portion III in FIG. 8; FIG. 10 is a top view of a cleaning device for the reflecting surface 27 of the dish concentrator according to a fifth embodiment of the present application; and FIG. 11 is a top view of a cleaning device for the reflecting surface 27 of the dish concentrator according to a sixth embodiment of the present application.

Figure 8:
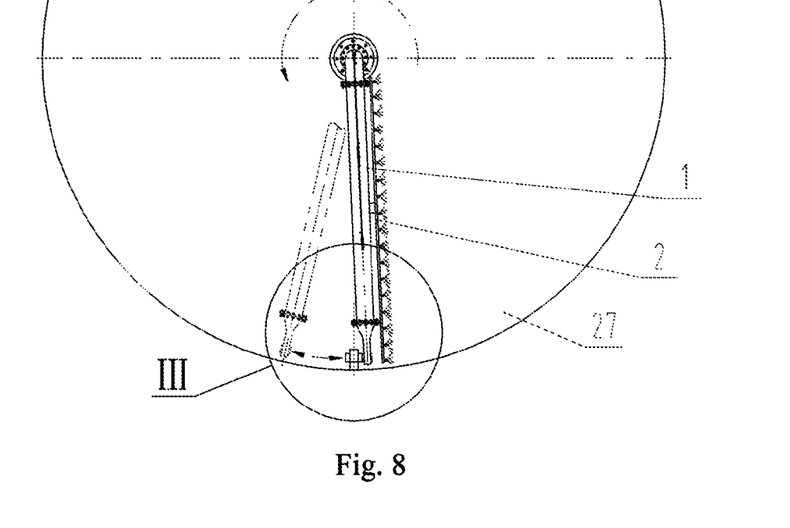
FIG. 8 is a view seen in a direction B of FIG. 1.
Figure 9:
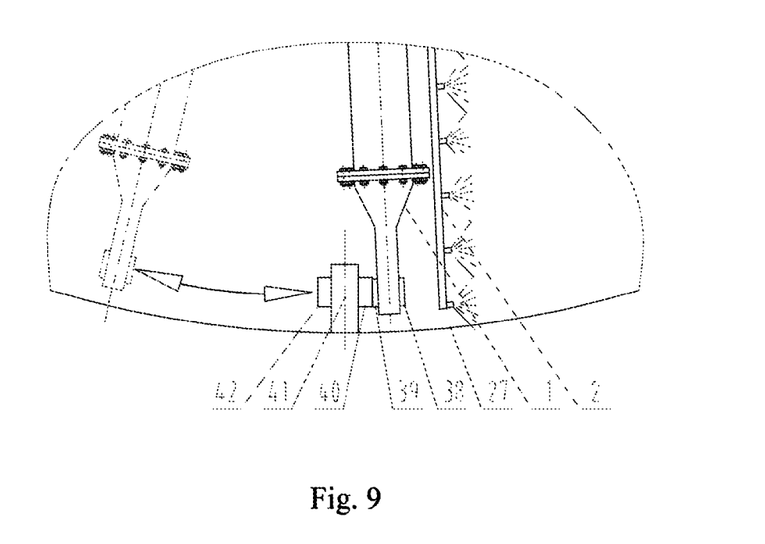
FIG. 9 is a partially enlarged view of portion III in FIG. 8.
Figure 10:
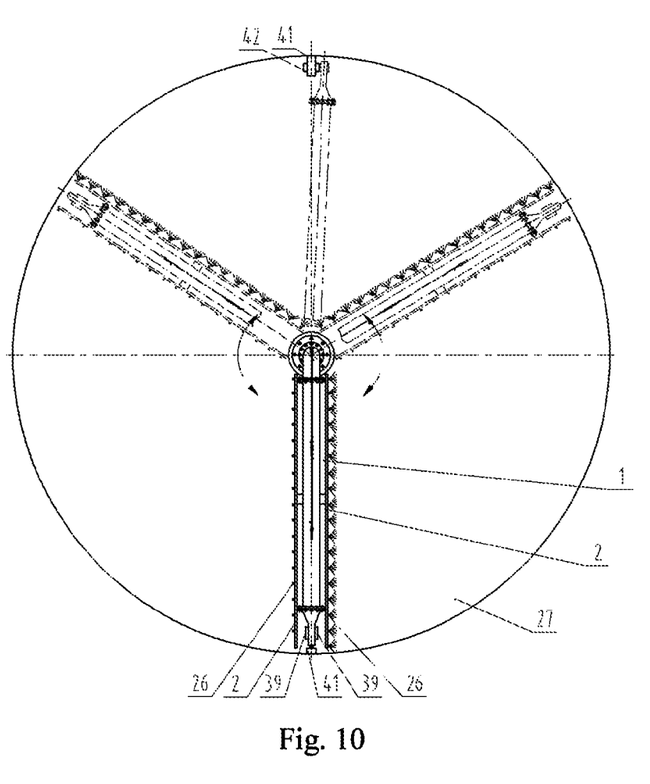
FIG. 10 is a top view of a cleaning device for a reflecting surface of a dish concentrator according to a fifth embodiment of the present application.
Figure 11:
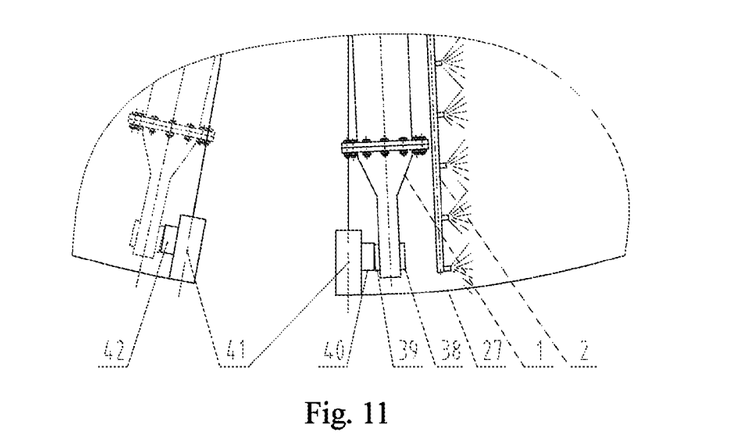
FIG. 11 is a top view of a cleaning device for a reflecting surface of a dish concentrator according to a sixth embodiment of the present application.

In another embodiment as shown in FIGS. 8 to 10, when the reflecting surface 27 of the concentrator is a paraboloid of revolution, a sensor seat 41 is arranged at a periphery of the paraboloid of revolution, and has two sides respectively provided with a reset sensor 40 and a position-limiting sensor 42. Two sides of a tail end of the low pressure air conveying tube 1 are respectively provided with a reset detector 39 corresponding to the reset sensor 40, and a position-limiting detector 38 corresponding to the position-limiting sensor 42.

With such structure, when the air conveying tube is at an initial position, the reset detector 39 is in contact with the reset sensor 40, and as the low pressure air conveying tube 1 starts to rotate, the reset detector 39 is separated from the reset sensor 40, and the low pressure air conveying tube 1 keeps rotating till the position-limiting detector 38 is in contact with the position-limiting sensor 42, which shows that the reflecting surface 27 of the concentrator has been cleaned once entirely. Then, the mobile cleaning station 23 closes the high pressure water and the low pressure air and switches a flowing direction of the high pressure air, and the pneumatic motor 13 rotates reversely till the reset detector 39 is in contact with the reset sensor 40 again, and the cleaning mechanisms, such as the low pressure air conveying tube, are reset.

Thus, the limit position of the low pressure air conveying tube 1 may be detected by the reset sensor 40 and the position-limiting sensor 42, thereby facilitating the control of the cleaning device.

In a case that the reflecting surface 27 of the concentrator is of a sector shape, similarly to the above operating principle, a sensor seat 41 is arranged at each of two ends of a periphery circular arc of the sector-shaped reflecting surface, and a reset sensor 40 is arranged at an inner side of one of the two sensor seats 41, and a position-limiting sensor 42 is arranged at an inner side of the other one of the two sensor seats 41. Two sides of the tail end of the low pressure air conveying tube 1 are respectively provided with a reset detector 39 corresponding to the reset sensor 40, and a position-limiting detector 38 corresponding to the position-limiting sensor 42.

With such structure, when the air conveying tube is at an initial position, the reset detector 39 at one side of the sector-shaped reflecting surface is in contact with the reset sensor 40, and as the air conveying tube starts to rotate, the reset detector 39 is separated from the reset sensor 40, and the air conveying tube keeps rotating till the position-limiting sensor 42 of the low pressure air conveying tube 1 is in contact with the position-limiting detector 38 at the other side of the sector-shaped reflecting surface, which shows that the sector-shaped reflecting surface 27 of the concentrator has been cleaned once entirely by the cleaning device.

Thus, the limit position of the low pressure air conveying tube 1 may be accurately detected through the detecting device formed by the sensor detector and the sensor, thereby ensuring the accuracy of the cleaning operation for the reflecting surface 27 of the concentrator, and also facilitating other operations such as switching the direction of the cleaning device.

Apparently, the detecting device of the cleaning device is not limited to the structure formed by the sensor and the detector, may also employ other structures, such as arranging a probe on the low pressure air conveying tube 1 and an approach switch on the reflecting surface 27 of the concentrator.

A cleaning device for a reflecting surface of a dish concentrator provided by the present application is described in detail hereinbefore. The principle and the embodiments of the present application are illustrated herein by specific examples. The above description of examples is only intended to help the understanding of the method and the spirit of the present application. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. A cleaning device for a reflecting surface of a dish concentrator, comprising:
   a low pressure air conveying tube and a high pressure water tube which are arranged side by side, wherein:
   the low pressure air conveying tube is configured to arrange on the reflecting surface of the dish concentrator, driven by a pneumatic motor and is configured to rotate about a central axis of the reflecting surface of the dish concentrator;
   a lower end of the low pressure air conveying tube is provided with a plurality of air flowing nozzles, and a lower end of the high pressure water tube is provided with a plurality of high pressure water nozzles via a nozzle mounting rod;
   in a cleaning operation, the low pressure air conveying tube and the high pressure water tube are configured to connect to a mobile cleaning station of a solar power generation system via a fluid connecting tube and a signal controlling line;
   after the cleaning operation is finished, the low pressure air conveying tube and the high pressure water tube are configured to disconnect from the mobile cleaning station; and
   the low pressure air conveying tube is connected to a curved tube, a transition tube and a corrugated tube in sequence, and the low pressure air conveying tube is mounted inside a mounting seat via a first bearing and a second bearing, and the mounting seat is mounted on a supporter of the concentrator.

2. The cleaning device for a reflecting surface of a dish concentrator according to claim 1, wherein one of the high pressure water tube is provided, and the plurality of high pressure water nozzles below the high pressure water tube are arranged in a single row at one side of the low pressure air conveying tube, and liquid in the high pressure water tube is water.

3. The cleaning device for a reflecting surface of a dish concentrator according to claim 1, wherein a plurality of the high pressure water tubes are provided, and one row of the high pressure water nozzles are provided below each of the high pressure water tubes, multiple rows of the high pressure water nozzles are arranged at one side or two sides of the low pressure air conveying tube, and one or more of the high pressure water tubes contain water, and the rest of the high pressure water tubes contain mixed liquid of water and detergent.

4. The cleaning device for a reflecting surface of a dish concentrator according to claim 2, wherein each of the high pressure water nozzles is fan-shaped and each of the air flowing nozzles is fan-shaped.

5. The cleaning device for a reflecting surface of a dish concentrator according to claim 4, wherein each of the air flowing nozzles is connected to a bottom of the low pressure air conveying tube via a vertical air conveying branch tube.

6. The cleaning device for a reflecting surface of a dish concentrator according to claim 4, wherein the air flowing nozzles are air blowing gaps arranged at a lower end of the low pressure air conveying tube, and widths of the air suction gaps gradually increase from a center to an edge in a radial direction of the reflecting surface of the concentrator.

7. The cleaning device for a reflecting surface of a dish concentrator according to claim 4, wherein the air flowing nozzles are air suction gaps arranged at a lower end of the low pressure air conveying tube, widths of the air suction gaps gradually increase from a center to an edge in a radial direction of the reflecting surface of the concentrator; and a water-jetting direction of the high pressure water nozzle is biased toward the air suction gap, and a rear side of the low pressure air conveying tube is further provided with an air constraining plate.

8. The cleaning device for a reflecting surface of a dish concentrator according to claim 1, wherein the pneumatic motor is connected to the corrugated tube via a gear transmission mechanism or a worm gear transmission mechanism.

9. The cleaning device for a reflecting surface of a dish concentrator according to claim 1, wherein the reflecting surface of the concentrator is of a sector shape, and a sensor seat is arranged at each of two ends of a periphery circular arc of the reflecting surface of the concentrator, and a reset sensor is arranged at an inner side of one of the two sensor seats, and a position-limiting sensor is arranged at an inner side of the other one of the two sensor seats; and two sides of a tail end of the low pressure air conveying tube are respectively provided with a reset detector corresponding to the reset sensor, and a position-limiting detector corresponding to the position-limiting sensor.

10. The cleaning device for a reflecting surface of a dish concentrator according to claim 9, wherein the reflecting surface of the concentrator is a whole paraboloid of revolution, a sensor seat is arranged at a periphery of the paraboloid of revolution, and has two sides respectively provided with a reset sensor and a position-limiting sensor; and two sides of a tail end of the low pressure air conveying tube are respectively provided with a reset detector corresponding to the reset sensor, and a position-limiting detector corresponding to the position-limiting sensor.

11. The cleaning device for a reflecting surface of a dish concentrator according to claim 5, wherein the low pressure air conveying tube is connected to a curved tube, a transition tube and a corrugated tube in sequence, and the low pressure air conveying tube is mounted inside a mounting seat via a first bearing and a second bearing, and the mounting seat is mounted on a supporter of the concentrator.

12. The cleaning device for a reflecting surface of a dish concentrator according to claim 6, wherein the low pressure air conveying tube is connected to a curved tube, a transition tube and a corrugated tube in sequence, and the low pressure air conveying tube is mounted inside a mounting seat via a first bearing and a second bearing, and the mounting seat is mounted on a supporter of the concentrator.

13. The cleaning device for a reflecting surface of a dish concentrator according to claim 7, wherein the low pressure air conveying tube is connected to a curved tube, a transition tube and a corrugated tube in sequence, and the low pressure air conveying tube is mounted inside a mounting seat via a first bearing and a second bearing, and the mounting seat is mounted on a supporter of the concentrator.

14. The cleaning device for a reflecting surface of a dish concentrator according to claim 5, wherein the reflecting surface of the concentrator is of a sector shape, and a sensor seat is arranged at each of two ends of a periphery circular arc of the reflecting surface of the concentrator, and a reset sensor is arranged at an inner side of one of the two sensor seats, and a position-limiting sensor is arranged at an inner side of the other one of the two sensor seats; and two sides of a tail end of the low pressure air conveying tube are respectively provided with a reset detector corresponding to the reset sensor, and a position-limiting detector corresponding to the position-limiting sensor.

15. The cleaning device for a reflecting surface of a dish concentrator according to claim 14, wherein the reflecting surface of the concentrator is a whole paraboloid of revolution, a sensor seat is arranged at a periphery of the paraboloid of revolution, and has two sides respectively provided with a reset sensor and a position-limiting sensor; and two sides of a tail end of the low pressure air conveying tube are respectively provided with a reset detector corresponding to the reset sensor, and a position-limiting detector corresponding to the position-limiting sensor.

16. The cleaning device for a reflecting surface of a dish concentrator according to claim 6, wherein the reflecting surface of the concentrator is of a sector shape, and a sensor seat is arranged at each of two ends of a periphery circular arc of the reflecting surface of the concentrator, and a reset sensor is arranged at an inner side of one of the two sensor seats, and a position-limiting sensor is arranged at an inner side of the other one of the two sensor seats; and two sides of a tail end of the low pressure air conveying tube are respectively provided with a reset detector corresponding to the reset sensor, and a position-limiting detector corresponding to the position-limiting sensor.

17. The cleaning device for a reflecting surface of a dish concentrator according to claim 16, wherein the reflecting surface of the concentrator is a whole paraboloid of revolution, a sensor seat is arranged at a periphery of the paraboloid of revolution, and has two sides respectively provided with a reset sensor and a position-limiting sensor;

and two sides of a tail end of the low pressure air conveying tube are respectively provided with a reset detector corresponding to the reset sensor, and a position-limiting detector corresponding to the position-limiting sensor.

18. The cleaning device for a reflecting surface of a dish concentrator according to claim 7, wherein the reflecting surface of the concentrator is of a sector shape, and a sensor seat is arranged at each of two ends of a periphery circular arc of the reflecting surface of the concentrator, and a reset sensor is arranged at an inner side of one of the two sensor seats, and a position-limiting sensor is arranged at an inner side of the other one of the two sensor seats; and two sides of a tail end of the low pressure air conveying tube are respectively provided with a reset detector corresponding to the reset sensor, and a position-limiting detector corresponding to the position-limiting sensor.

19. The cleaning device for a reflecting surface of a dish concentrator according to claim 18, wherein the reflecting surface of the concentrator is a whole paraboloid of revolution, a sensor seat is arranged at a periphery of the paraboloid of revolution, and has two sides respectively provided with a reset sensor and a position-limiting sensor; and two sides of a tail end of the low pressure air conveying tube are respectively provided with a reset detector corresponding to the reset sensor, and a position-limiting detector corresponding to the position-limiting sensor.

* * * * *